US007584201B2

(12) United States Patent
Casey (10) Patent No.: US 7,584,201 B2
(45) Date of Patent: Sep. 1, 2009

(54) MANAGEMENT OF MOBILE-DEVICE DATA

(75) Inventor: Steven M. Casey, Littleton, CO (US)

(73) Assignee: Qwest Communications International, Inc, Denver, CO (US)

(*) Notice: Subject to any disclaimer, the term of this patent is extended or adjusted under 35 U.S.C. 154(b) by 347 days.

(21) Appl. No.: 11/202,432

(22) Filed: Aug. 10, 2005

(65) Prior Publication Data

US 2007/0038680 A1    Feb. 15, 2007

(51) Int. Cl.
G06F 17/00    (2006.01)

(52) U.S. Cl. .................... 707/101; 707/10; 707/202; 707/204

(58) Field of Classification Search .............. 455/456.1; 709/231; 707/104.1, 201, 203, 10, 101, 202, 707/204
See application file for complete search history.

(56) References Cited

U.S. PATENT DOCUMENTS

| 6,813,498 | B1 * | 11/2004 | Durga et al. ............. 455/456.1 |
| 7,505,762 | B2 * | 3/2009 | Onyon et al. ................. 707/204 |
| 2001/0025343 | A1 * | 9/2001 | Chrisop et al. .............. 711/163 |
| 2003/0140158 | A1 * | 7/2003 | Lee et al. ..................... 709/231 |
| 2005/0186954 | A1 * | 8/2005 | Kenney ...................... 455/420 |
| 2005/0226468 | A1 * | 10/2005 | Deshpande et al. .......... 455/411 |
| 2006/0190470 | A1 * | 8/2006 | Lemnotis ..................... 707/101 |
| 2006/0253680 | A1 * | 11/2006 | Vitanov et al. .............. 711/171 |
| 2007/0021112 | A1 * | 1/2007 | Byrne et al. ................. 455/419 |
| 2008/0208617 | A1 * | 8/2008 | Onyon et al. ................. 707/204 |
| 2008/0228707 | A1 * | 9/2008 | Bhansali et al. ................ 707/2 |

OTHER PUBLICATIONS

Motorola Backup- 20 pages, printed Nov. 18, 2005 from https//motorolabackup.tarsin.com/home.htm?locate=en_US&country=US.

* cited by examiner

*Primary Examiner*—Charles Rones
*Assistant Examiner*—Rezwanul Mahmood (57) ABSTRACT

Information is maintained on a mobile client device. A delete command is received at the mobile client device over a wireless mobile network from a mobile-device data management server configured to provide mobile-device service to multiple mobile client devices over the wireless mobile network. The information is deleted from the mobile client device automatically and without user interaction in accordance with the delete command.

7 Claims, 5 Drawing Sheets

MANAGEMENT OF MOBILE-DEVICE DATA

BACKGROUND OF THE INVENTION

This application relates generally to mobile devices. More specifically, this application relates to management of data stored on mobile devices.

The use of mobile devices, including mobile telephones, personal-digital assistants, and the like, has both been increasing in recent years and becoming more diverse in application. For example, when mobile telephones were initially introduced to the marketplace, they used cellular technology to permit telephone connections to be established but had little other functionality. Now, mobile telephones are frequently equipped with a variety of different functionality, including digital cameras, Internet browser capabilities, email capabilities, digital-music functionality, video-streaming functionality, and the like. It is expected that the functionality of such mobile devices will yet continue to expand. This functionality is supported by large data-storage capabilities, with mobile telephones now frequently having storage capacities on the order of gigabytes.

One consequence of this expanded functionality and data-storage capability is that the data on mobile devices is now frequently of greater value than the mobile device itself. In many instances, the data stored on the device may include sensitive electronic-mail communications or other documents—data that might, for instance, be highly sought as a target of corporate espionage, particularly for mobile devices owned by high-level executives, political figures, and the like. Indeed, there appears to be evidence that theft of mobile devices is now motivated more by a desire to gain access to the data on the device than to acquire the device itself. Of course, the concern about the security of information that resides on the device is prompted not only by fears of potential theft, but also by the possibility that the device will be mislaid or lost.

There is accordingly a general need in the art for improved methods and systems for managing the security of data on mobile devices.

BRIEF SUMMARY OF THE INVENTION

In a first set of embodiments, information is maintained on a mobile client device. A delete command is received at the mobile client device over a wireless mobile network from a mobile-device data management server configured to provide mobile-device service to a plurality of mobile client devices over the wireless mobile network. The information is deleted from the mobile client device automatically and without user interaction in accordance with the delete command.

In some such embodiments, the information is deleted in a priority sequence defined by the delete command. For instance, when the information comprises data and applications, the priority sequence may require deletion of data before applications. The information may also be deleted by executing a secure delete that overwrites the information. In some embodiments, a backup command is received at the mobile client device over the wireless mobile network. In such embodiments, a copy of the information is transmitted from the mobile client device to the mobile-device data management server over the wireless mobile network automatically and without user interaction in accordance with the backup command for backup storage of the copy.

These methods may be embodied on a computer-readable storage medium having a computer-readable program that directs operation of a mobile client device having a storage device. The computer-readable program comprises a plurality of application data controllers, each of which comprises instructions to maintain a portion of the information on the storage device in a corresponding database. The computer-readable program also comprises a media data controller that comprises instructions to interact with each of the application data controllers to manage the information. A deletion module is configured to interact with the media data controller and comprises instructions to implement the methods described above.

In a second set of embodiments, activation of a mobile client device is detected over a wireless mobile network at a mobile-device data management server configured to provide mobile-device service to a plurality of mobile client devices over the wireless mobile network. The mobile client device is identified as inaccessible by a subscriber to the mobile-device service for the mobile client device. A delete command is transmitted from the mobile-device data management server to the mobile client device over the wireless mobile network to cause the mobile client device to delete information maintained on the mobile client device automatically and without user interaction.

In some of these embodiments, a backup command is transmitted from the mobile-device data management server to the mobile client over the wireless mobile network to cause the mobile client to transmit a copy of information maintained on the mobile client device to the mobile-device data management server automatically and without user interaction for backup storage of the copy.

A location of the mobile client device may also be identified at the mobile-device data management server using a global-positioning-system ("GPS") signal generated at the mobile client device. It may be determined from the GPS signal that the mobile client device is not in motion, in which case the subscriber may be notified of the location of the mobile client device. Alternatively, the delete command may be transmitted in response to determining from the GPS signal that the mobile client device is in motion.

In some embodiments, the delete command includes a priority sequence for deletion of the information. For example, the information may comprise data and applications, with the priority sequence requiring deletion of data before applications. In one embodiment, the delete command requires execution of a secure delete by overwriting the information.

These methods may be embodied on a computer-readable storage medium having a computer-readable program for directing operation of the mobile-device data management server. The computer-readable program comprises instructions for implementing the methods described.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems that permit management of data on mobile devices. References herein to "mobile devices" are intended to refer broadly to any wireless electronic device that has the capability of receiving content wirelessly. Examples of mobile devices include cellular telephones, personal digital assistants, and the like. Management of the data on the mobile devices as described herein is generally performed in response to theft or other loss of the device, but may be performed under other conditions. Theft or loss of the device is considered herein to be examples of circumstances where the device is inaccessible to a subscriber of services provided to the device. The data management may include functionality that permits a particular mobile device to be located using global-positioning technology, permits data and/or applications stored on the particular mobile device to be backed up, and/or permits data and/or applications stored on the particular mobile device to be deleted.

Figure 1:
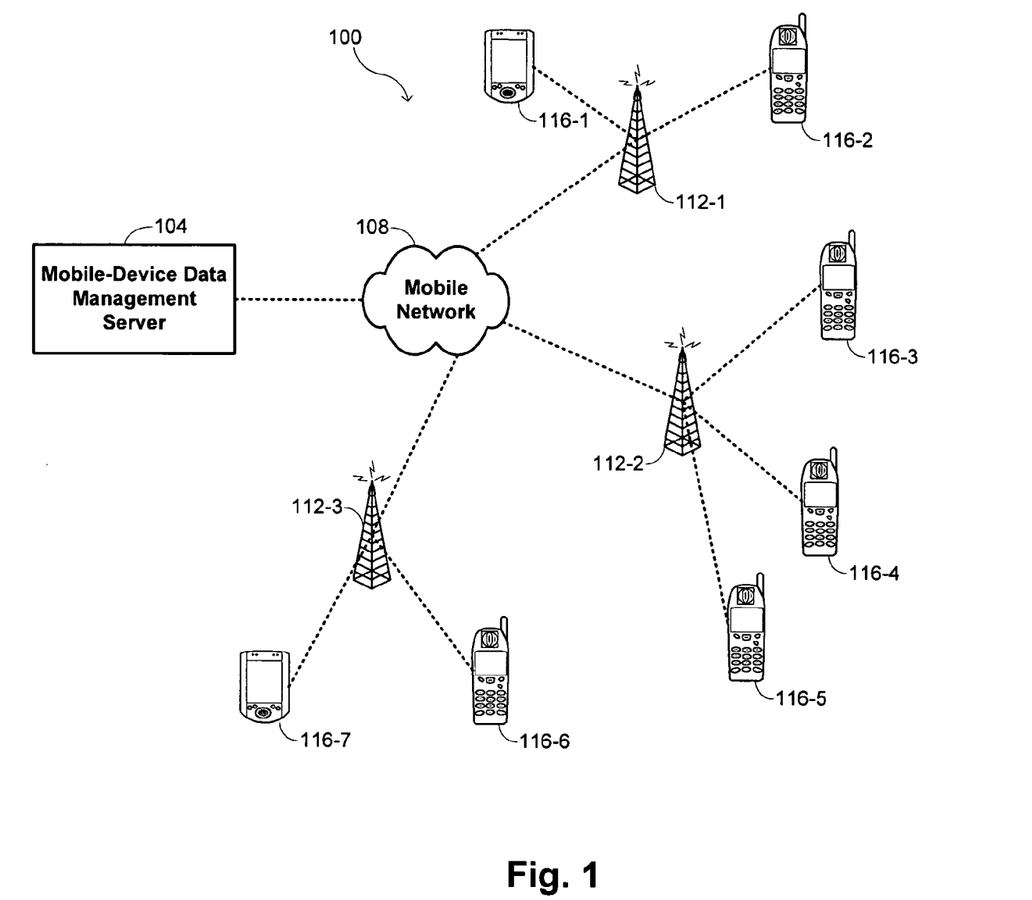
FIG. 1 is a schematic diagram that provides an overview of a client-server environment in which mobile devices function.

One physical arrangement that may be used to provide services to mobile devices is illustrated with the schematic diagram shown in FIG. 1. It is generally contemplated that such services may comprise any services that include the communication of information wirelessly to the mobile devices, such as by using the architecture illustrated in FIG. 1. For example, mobile-device services that may be provided include telephone services, electronic-mail services, video-streaming services, audio-file downloads, and the like. Such services are typically provided on behalf of a subscriber to the services in accordance with a subscription agreement with a service provider. Data and applications that are stored on the mobile device may result from the implementation of such mobile-device services. But it is recognized that in some instances, other functionality of the mobile devices may result in the storage of other data on the mobile devices. Examples of such other data include video files generated by camera-functionality of the mobile devices, audio files recorded directly by the mobile devices without having been transmitted over a wireless network, telephone and electronic-mail directory information input directly by subscribers into the devices, and other data that may be stored directly on the devices without being transmitted over a wireless network. It is contemplated that such other data may also be subject to the data-management functionality described herein, permitting such data to be backed up and deleted, notwithstanding that its origin its external to the mobile-device services provided on behalf of the subscriber.

The system architecture 100 shown in FIG. 1 comprises a client-server architecture, with the client and server provided in communication over a wireless network. The server functions are performed by a mobile-device data management server 104 that is generally operated under the control of the service provider. The clients are embodied by a plurality of mobile devices 116, with communications between the mobile-device data management server 104 and the mobile devices 116 being effected through radio links. For instance, FIG. 1 shows an embodiment in which communications are made through a mobile network 108 that is itself in communication with a plurality of base stations 112 hat are distributed geographically. This arrangement permits each mobile device 116 to communication with the mobile-device data management server 104 through one of the base stations 112 depending on the current physical location of the mobile device 116. It also permits the actual communications pathway used to change as the mobile device 116 changes position to move into closer proximity to a different one of the base stations 112.

The illustration in FIG. 1 emphasizes that the mobile devices 116 may be different types of electronic devices, even in embodiments that use a single mobile network 108, by showing certain of the devices (116-2, 116-3, 116-4, 116-5, and 116-6) as cellular telephones and by showing other of the devices (116-1 and 116-7) as personal digital assistants. In other embodiments, a plurality of mobile networks 108 may interface with the mobile-device data management server 104. The communications links are shown as dotted lines in the drawing, with the exemplary embodiment illustrating an implementation in which all communications are performed through radio links or through other forms of wireless communication. It will be appreciated, however, that wire-based links may alternatively be used in some embodiments, with certain embodiments using a combination of wire-based and wireless communications. For instance, in one embodiment, the mobile network 108 might implement a wire-based interconnection of the base stations 112 with the mobile-device data management server 104, with communications between the base stations 112 and the mobile devices 116 still proceeding wirelessly.

Figure 2:
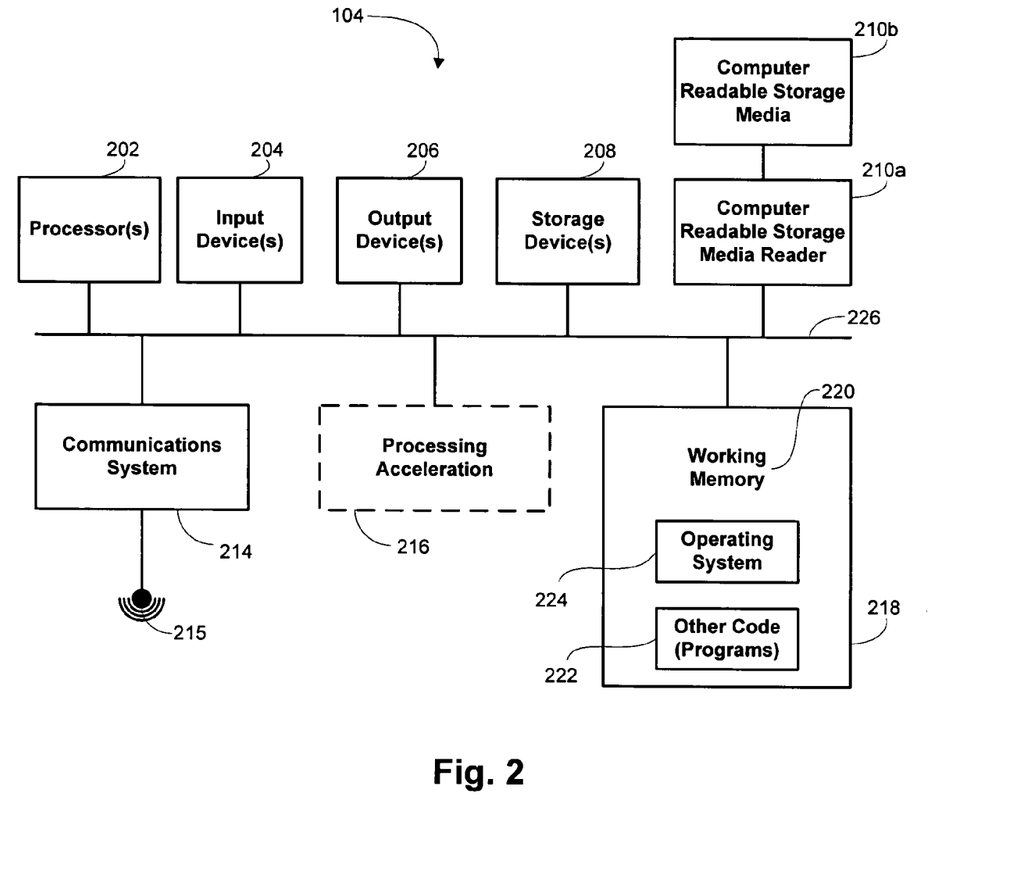
FIG. 2 illustrates a structure that may be used for a mobile-device data management server in an embodiment.

A structure that may be used for the mobile-device data management server 104 is illustrated with the schematic diagram of FIG. 2. This drawing broadly illustrates how individual system elements of the mobile-device data management server 104 may be implemented in a separated or more integrated manner. The mobile-device data management server 104 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged wirelessly through an antenna 215.

The mobile-device data management server 104 also comprises software elements, shown as being currently located within working memory 220, including an operating system 224 and other code 222, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 3:
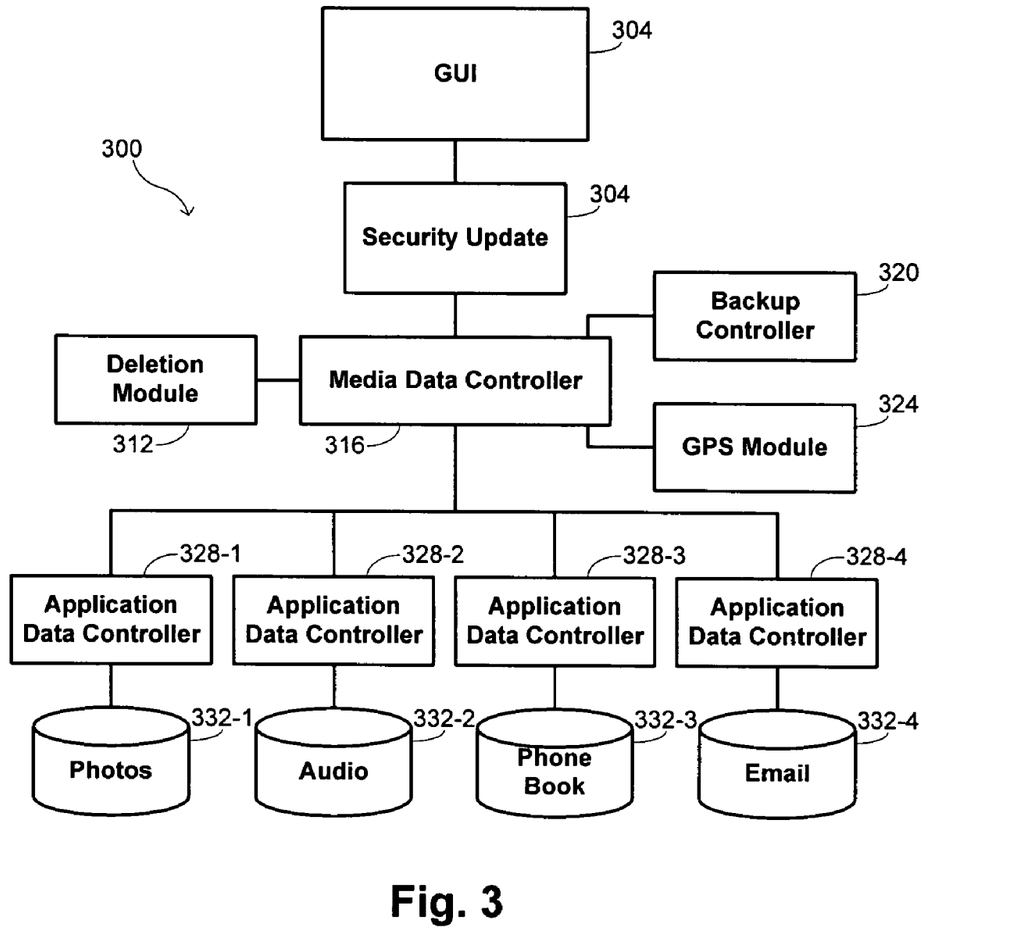
FIG. 3 is a schematic diagram that illustrates a software architecture that may be embodied on a mobile device in some embodiments to implement methods of the invention.

Similar types of hardware as that shown in FIG. 2 may also be included in each of the mobile devices 116. FIG. 3 provides an illustration of how the functionality of the invention may be achieved with a software architecture 300 implemented by the hardware of one of the mobile devices 116. This software architecture 300 is implemented by a mobile-device data management client resident within the mobile device 116. The software architecture 300 includes a graphical user interface 304 that may be used to access functionality implemented by a media data controller 316, which is generally responsible for coordinating a variety of applications and coordinating requests made by other controllers. Access to this functionality may be controlled by a security-update module 308, which may implement any of a variety of different types of security protocols, password-based protocols being one relatively simple example, although more complex protocols that use such features as biometrics may alternatively be used.

The media data controller 316 is responsible for operating one or more application data controllers 328, each of which is in turn responsible for implementing one or more functions performed by the mobile device 116. Implementation of such functions by the application data controller 328 may involve the storage and/or retrieval of data stored in respective databases 332. Merely by way of example, the drawing illustrates four specific types of functionality and corresponding databases 332 used by the respective application data controllers 328 in implementing the functionality. By assigning different application data controllers 328 to different types of user information, the application data controllers 328 may be customized to fit the application interfaces for different programs and interface needs.

A first example is the maintenance of photographs in a photographs database 332-1 by application data controller 328-1. Such photographs may be obtained by a camera device incorporated into the mobile device 116 or could be obtained by some type of file transmission by a wired interface with the mobile device 116 or over the mobile network 108. Similar to a photographs database 332-1 is a video-clips database that could store motion video sequences. A second example is the maintenance of audio files in an audio database 332-2 by application data controller 328-2. The audio files could be maintained in any suitable format, MP3 being one example. A third example is the maintenance of a telephone and/or electronic-mail-address directory, commonly referred to as a "phone book," in database 332-3 and maintained by application data controller 328-3. Electronic mail itself serves as a fourth example of data that may be maintained in an electronic-mail database 332-4 by application data controller 328-4. Still other examples of types of data that may be maintained on the mobile device 116 by suitable application data controllers 328 will be evident to those of skill in the art after reading this description.

In addition to the various application data controllers 328, the software architecture may include a backup controller 320 and a deletion module 312, both of which are also controlled by the media data controller 316. The backup controller 320 implements functionality that responds to instructions from the media data controller 316 to transmit backup copies of the data stored in the various databases 332. Such an operation typically retains a copy of the data on the mobile device 116, with the backup copy being transmitted over the wireless network 108 to the mobile-device data management server 104. Storage of the backup copy may be maintained in a number of different ways, such as by storing it on the storage device 208 comprised by mobile-device data management server 104 or by transmitting it to another storage device for backup access. In the event that a subscriber wishes to retrieve a backup copy of information, it may be accessed by an interface with the appropriate storage device managed by the mobile-device data management server 104, one convenient mechanism for doing so being a web-based interface.

Unlike the backup controller 320, the deletion module 312 implements functionality that responds to instructions from the media data controller 316 to destroy the data maintained in the various databases 332. As explained in further detail below, such deletion functionality is generally used when the mobile device has become inaccessible to the subscriber and provides at least some level of assurance that unauthorized access to the data is mitigated. The deletion module 312 may cause the deletion to occur in a number of different ways, including by assigning different priority levels to types of data and by performing different levels of deletion of different embodiments. For instance, differences in priority levels may be manifested by the deletion causing data expected to be more sensitive, such as electronic-mail data, to be deleted before less-sensitive data. Such priority levels may also be manifested with data being deleted preferentially before applications. The assignment and implementation of such priority differences is useful because of the inaccessibility of the mobile device 116 to the subscriber—there may be low remaining battery power that limits the amount of data that may be deleted or there may be a possibility of intervention by a thief to prevent the deletion functions from being completed. Different levels of deletion may be manifested in the way that the deletion is performed. For example, at one level, the data may be deleted using a "standard delete" function in which a file entry identifying the data is renamed with an invalid initial character, thereby making the file inaccessible through a normal operating-system function. At a higher level, the data may be deleted using a "secure delete" function in which the data are overwritten with a random binary sequence. At this higher level, recovery of the data even by an extraction program is precluded while such recovery might still be possible with the standard delete. The priority assignment may also be combined in some embodiments with the different deletion levels, such as in an embodiment where a standard delete is initially performed and followed by a secure delete. Such a process attempts to achieve the stronger deletion, but accounts for the fact that the ability to do so may be limited so that at least the weaker deletion is initially attempted.

The software architecture may also include a global-positioning-system ("GPS") module 324 that is in communication with the media data controller 216 and with a GPS device comprised by the mobile device 116. Such a module is used in embodiments of the invention to locate the mobile device 116 and perhaps also make assessments whether the mobile device 116 is stationary or not.

Different communications protocols may be used internally to the software architecture. For example, in one embodiment, extensible markup language ("XML") may be used for communication by the media data controller 316 with the deletion module 312, the backup controller 320, and the various application data controllers 328.

Figure 4A:
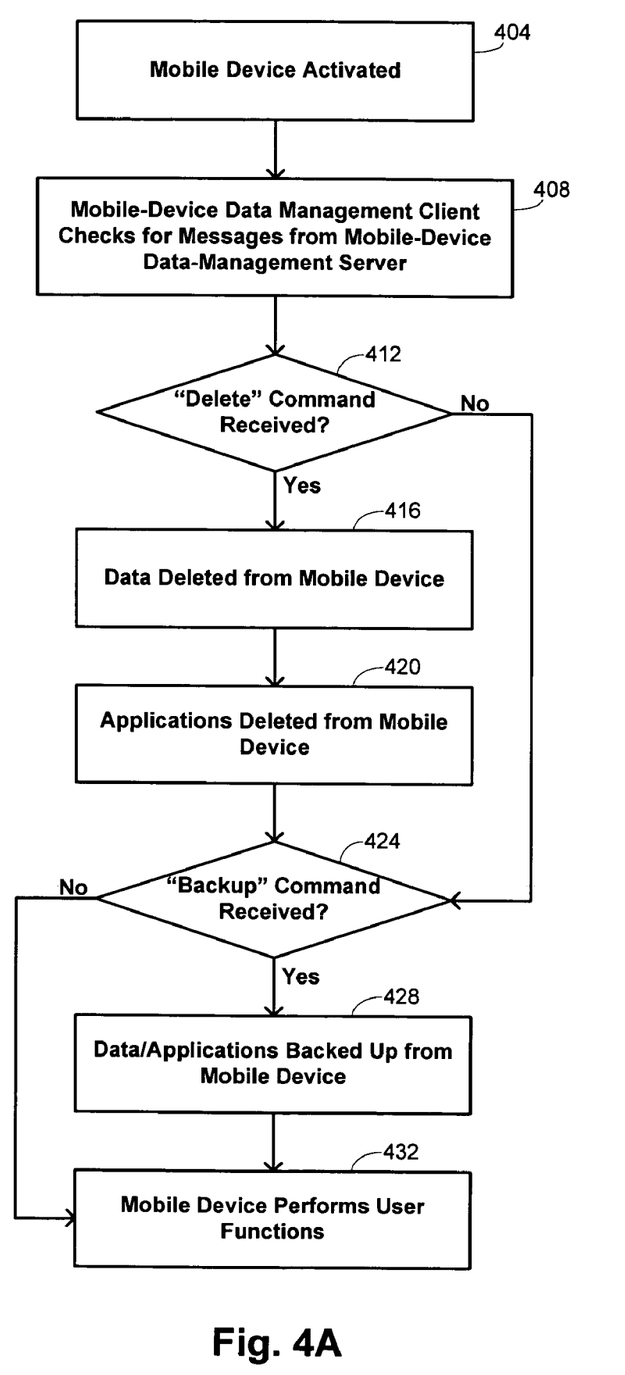
FIG. 4A is a flow diagram illustrating methods for managing data on a mobile device in some embodiments.
Figure 4B:
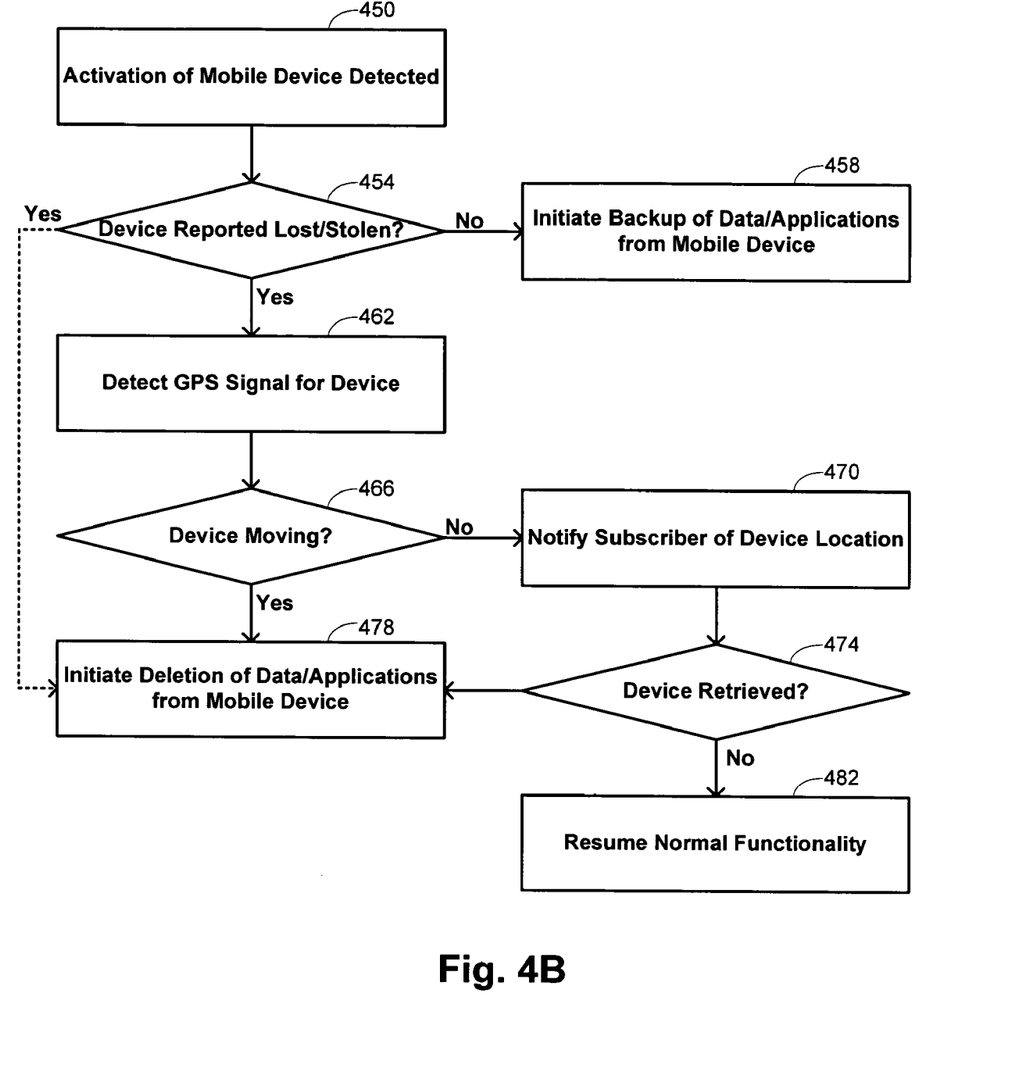
FIG. 4B is a flow diagram illustrating methods for managing data on a mobile device in other embodiments.

Methods of the invention are illustrated with FIGS. 4A and 4B, with FIG. 4A showing a method that may be performed by one of the mobile devices 116 in an embodiment and FIG. 4B showing a method that may be performed by the mobile-device data management server 104 in an embodiment. In each instance, certain steps are shown as being performed in a specified sequence, but such an illustration is not intended to be limiting. Additional steps may be performed in some alternative embodiments and some of the steps may be deleted in other embodiments. Also, the order of the steps may be different in various alternative embodiments.

The method of FIG. 4A begins at block 404 with the mobile device 116 being activated by a user. At block 408, the mobile-device data management client checks for messages from the mobile-device data management server 104 that may be transmitted over the mobile network 108. The specific messages described in connection with FIG. 4A correspond to commands that may be performed automatically, i.e. without user intervention. This automatic character of the commands is advantageous in embodiments where they have been transmitted in response to the mobile device 116 being inaccessible by the subscriber; under such circumstances, it is desirable that the commands be executed without the potential intervention by a thief.

One of the commands that may be received is a "delete" command instructing that some or all of the data and/or applications stored on the mobile device be deleted. As previously noted, such a command may include a defined prioritization of material to be deleted and/or define a level of deletion to be performed. If such a command is received, as checked at block 412, the data and/or applications are deleted from the mobile device as indicated at blocks 416 and 420. The system may work with encrypted file systems when executing the delete command because each application data controller 328 may be configured to interface with respective digital assets 332 without needing to know what is stored in those assets 332.

Another of the commands that may be received is a "backup" command instructing that some or all of the data and/or applications stored on the mobile device be copied to an external source for backup-retrieval capability. Such commands may also sometimes include defined prioritizations so that, if the command is received as checked at block 428, certain material is preferentially backed up before other material. This may provide greater assurance that the material viewed as most important is backed up even if the process is unexpectedly interrupted. The flow diagram indicates that the data and/or applications are backed up from the mobile device by execution of this command at block 428. There are a variety of communications protocols that may be used in effecting the backup and the invention is not limited to the use of any particular protocol. For example, in different embodiments, the file transfer protocol ("FTP"), the secure sockets layer ("SSL"), or a port-83 hypertext markup language ("HTML") protocol may be used. Again, the system may work with encrypted file system when executing the backup command because each application data controller 328 may be configured to interface with respective digital assets 332 without needing to know what is stored in those assets 332.

Irrespective of whether a "delete" command and/or or "backup" command is received, the mobile device 116 is put into a state where it is ready to perform user functions at block 432. Such user functions may depend on the type of the mobile device and its standard capabilities.

Transmission of the "delete" and/or "backup" commands is performed by the mobile-device data management server 104, with decisions to do so governed by a defined set of conditions. Examples of the type of conditions that may trigger the transmission of such commands to individual mobile devices 116 is illustrated for some embodiments with the flow diagram of FIG. 4B, although it will be appreciated by those of skill in the art that different sets of conditions may be applied to trigger such transmissions in other embodiments.

At block 450, activation of a particular mobile device 116 and its accessibility over the mobile network 108 is detected. Once the device has been identified, a check is performed at block 454 whether the device is known to be inaccessible to the subscriber, such as by having been reported by the subscriber as having been lost or stolen. If no such report has been received, a periodic backup of data and/or applications may be initiated at block 458 by transmitting the "backup" command to the mobile device 116 over the mobile network 108. It is not necessarily the case that the "backup" command will be issued whenever the mobile device 116 is activated without their having been a report of loss or theft; in most instances, such a command will only be issued at periodic intervals, such as once per day or once per week. This may be implemented by having an additional check to verify that the most recent backup of the identified mobile device 116 occurred more than one day or one week previously.

If the identified device 116 has been reported as inaccessible to the subscriber, there are a number of different options that may be implemented depending on circumstances. For example, if the subscriber has indicated that the device 116 is believed to be lost or mislaid, but has no specific reason to believe it has been stolen, the GPS capabilities of the device 116 may be used to identify a location for the device. This may be done by detecting a GPS signal for the device 116 at block 462. A further evaluation may be performed by checking at block 466 whether the device 116 is moving, its being in a state of motion serving as an indicator that the device 116 is being used and therefore likely to have been stolen. Such a determination that the device 116 has been stolen results in the deletion of data and/or applications being initiated at block 478 by transmitting the "delete" command. The drawing also indicates with a dashed line that an initial report by the subscriber that the device 116 is known to have been stolen, rather than merely lost or mislaid, may result in transmission of the "delete" command at block 478 directly.

If the device 116 can be located from its GPS signal and is not moving, the subscriber may then be notified of the device's location at block 470, which permits the subscriber to attempt to retrieve the device. Usually, some limited time will be extended to the subscriber to effect the retrieval, with a check being made at block 474 whether it has been retrieved within that time. If the subscriber has been unable to retrieve it, such as because it is located on a thief's premises, deletion of the data and/or applications may still be initiated at block 478. If the device 116 can be retrieved by the subscriber however, the report of its inaccessibility is canceled and normal functionality resumed at block 482.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method comprising:
maintaining information on a mobile client;
receiving an indication that the mobile client device has been lost or stolen;
in response to the received indication, transmitting a backup command to the mobile client device over a wireless mobile network;
transmitting a copy of the information from the mobile client device to a mobile-device data management server over the wireless mobile network automatically and without user interaction in accordance with the backup command, wherein a user of the mobile client device is locked from accessing the information and is locked from cancelling or modifying the backup command;
in response to the received indication, transmitting a delete command to the mobile client device over the wireless mobile network from the mobile-device data management server independently from the backup command, wherein deleting the information comprises executing a secure delete by overwriting the information with a random binary sequence, and wherein the deleting the information further comprises deleting the information in a priority sequence defined by the delete command, wherein the information comprises sensitive data, less-sensitive data, and application(s) and the priority sequence requires deletion of the sensitive data before the less-sensitive data, and deletion of the less-sensitive data before the application(s); and deleting the information from the mobile client device automatically and without user interaction in accordance with the delete command, wherein the user of the mobile client device is locked from accessing the information and is locked from cancelling or modifying the delete command.

2. A mobile-client device comprising a computer-readable storage medium having a computer-readable program embodied therein for directing operation of the mobile client device having a storage device, the computer-readable program comprising:

a plurality of application data controllers, each such application data controller comprising instructions to maintain a portion of the information on the storage device in a corresponding database;

a media data controller comprising instructions to interact with each of the application data controllers to manage the information; and a deletion module configured to interact with the media data controller and comprising:

instructions for receiving an indication that the mobile client device has been lost or stolen;

in response to the received indication, instructions for transmitting a backup command to the mobile client device over a wireless mobile network;

transmitting a copy of the information from the mobile client device to a mobile-device data management server over a wireless mobile network automatically and without user interaction in accordance with the backup command, wherein a user of the mobile client device is locked from accessing the information and is locked from cancelling or modifying the backup command;

in response to the received indication, instructions to transmit a delete command to the mobile client device over the wireless mobile network from the mobile-device data management server independently from the backup command, wherein deleting the information comprises executing a secure delete by overwriting the information with a random binary sequence, and wherein the deleting the information further comprises deleting the information in a priority sequence defined by the delete command, wherein the information comprises sensitive data, less-sensitive data, and application(s) and the priority sequence requires deletion of the sensitive data before the less-sensitive data, and deletion of the less-sensitive data before the application(s); and instructions to delete the information from the storage device automatically and without user interactions in accordance with the delete command, wherein the user of the mobile client device is locked from accessing the information and is locked from cancelling or modifying the delete command.

3. The mobile client device recited in claim 2 wherein the computer-readable program further comprises a backup controller configured to interact with the media data controller and comprising:

instructions to receive a backup command transmitted to the mobile client device over the wireless mobile network from the mobile-device data management server; and instructions to transmit a. copy of the information from the storage device to the mobile-device data management server over the wireless mobile network automatically and without user interaction in accordance with the. backup command for backup storage of the copy.

4. The method recited in claim1 further comprising identifying a location of the mobile client device at the mobile-device data management server using a global-positioning-system ("GPS") signal generated at the mobile client device.

5. The method recited in claim 4 further comprising:

determining, from the GPS signal, that the mobile client device is not in motion; and notifying the subscriber of the location of the mobile client device.

6. The method recited in claim 4 wherein transmitting the delete command is performed in response to determining, from the OPS signal that the mobile client device is in motion.

7. A computer-readable storage medium having a computer-readable program embodied therein for directing operation of a mobile-device data management server configured to provide mobile-device service to a plurality of mobile client devices over a wireless mobile network, which when executed by one or more machines, cause the one or more machines to:

detect activation of a mobile client device over the wireless mobile network;

identify the mobile client device as inaccessible by a subscriber to the mobile-device service for the mobile client device;

in response to the mobile client device being inaccessible to the subscriber, transmit a delete command from the mobile-device data management server to the mobile client device over the wireless mobile network to cause the mobile client device to delete information maintained on the mobile client device automatically and without user interaction, wherein a user of the mobile client device is locked from accessing the information and is locked from cancelling or modifying the delete command, wherein deleting the information comprises executing a secure delete by overwriting the information with a random binary sequence, and wherein the deleting the information further comprises deleting the information in a priority sequence defined by the delete command, wherein the information comprises sensitive data, less-sensitive data, and application(s) and the priority sequence requires deletion of the sensitive data before the less-sensitive data, and deletion of the less-sensitive data before the application(s); and transmit a backup command from the mobile-device data management server to the mobile client over the wireless mobile network to cause the mobile client device to transmit a copy of information maintained on the mobile client device to the mobile- device data management server automatically and without user interaction for backup storage of the copy, wherein the user of the mobile client device is locked from accessing the information and is locked from cancelling or modifying the backup command;

wherein transmitting of the delete command is executed independently of the instruction to transmit the backup command.

* * * * *

UNITED STATES PATENT AND TRADEMARK OFFICE
CERTIFICATE OF CORRECTION

PATENT NO.         : 7,584,201 B2                                        Page 1 of 1
APPLICATION NO. : 11/202432
DATED              : September 1, 2009
INVENTOR(S)        : Casey It is certified that error appears in the above-identified patent and that said Letters Patent is hereby corrected as shown below:

Column 3, Line 57, delete "that its origin its" and insert --that its origin is--, therefor.

Column 4, Line 3, replace "hat" with "that", therefor.

Column 10, Line 5, replace "a." with "a", therefor.

Column 10, Line 8, replace "the." with "the", therefor.

Column 10, Line 21, replace "OPS" with "GPS", therefor.

Signed and Sealed this

Seventeenth Day of November, 2009

David J. Kappos
*Director of the United States Patent and Trademark Office*